Figure 1:
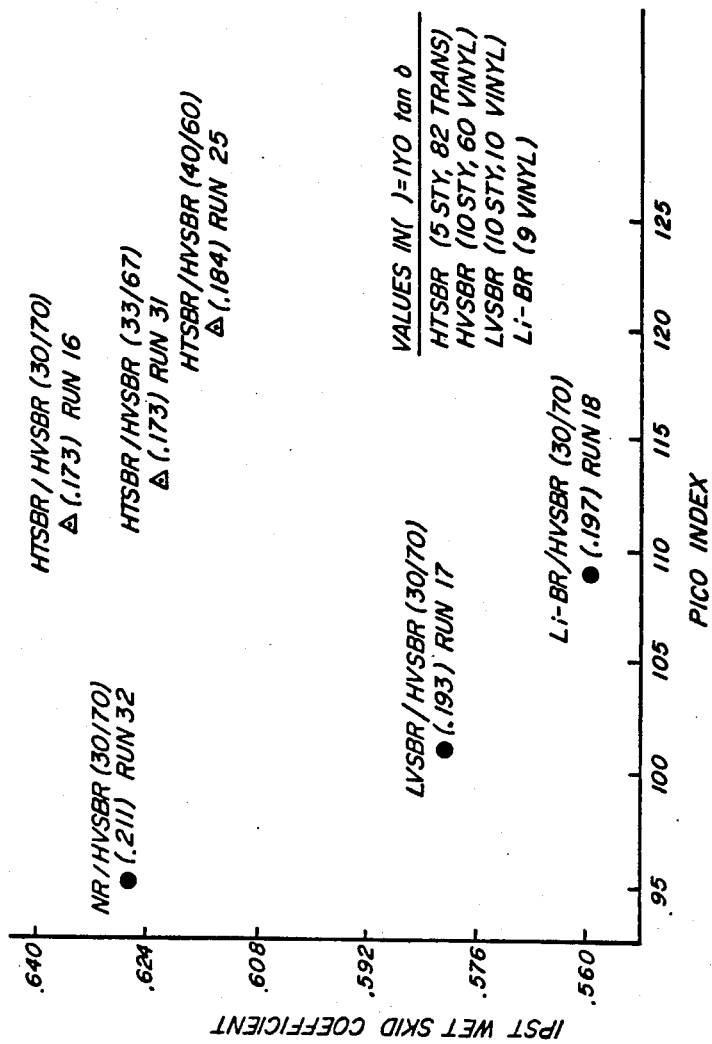

United States Patent [19]

Hargis et al.

[11] Patent Number: 4,669,518
[45] Date of Patent: Jun. 2, 1987

[54] TIRE TREAD HAVING HIGH TRANS BUTADIENE BASED ELASTOMERIC BLOCK COPOLYMERS AND BLENDS

[75] Inventors: Ivan G. Hargis, Tallmadge; Hubert J. Fabris, Akron; Russell A. Livigni, Akron; Sundar L. Aggarwal, Akron; George B. Thomas, Tallmadge; John A. Wilson, Akron, all of Ohio

[73] Assignee: GenCorp Inc., Akron, Ohio

[21] Appl. No.: 848,550

[22] Filed: Apr. 7, 1986

Related U.S. Application Data

[62] Division of Ser. No. 723,385, Apr. 15, 1985, Pat. No. 4,616,065.

[51] Int. Cl.$^4$ .............................................. B60C 11/00
[52] U.S. Cl. ................................................ 152/209 R
[58] Field of Search ................... 152/209 R; 525/236, 525/237, 99, 316; 524/505

[56] References Cited

U.S. PATENT DOCUMENTS

| 4,310,582 | 1/1982 | Stumpe, Jr. ................... 525/236 X |
| 4,387,756 | 6/1983 | Ogawa et al. .................. 152/209 R |
| 4,387,757 | 6/1983 | Ogawa et al. .................. 152/209 R |

OTHER PUBLICATIONS

Cohen et al., Macromolecules, 15, 1982, "Properties of Block Copolymers and Homopolymer Blends Comprised of 1,2-Polybutadiene and 1,4-Polybutadiene, pp. 370-375.
Chemical Abstracts, 100, 1984, 176245f.
Chemical Abstracts, 100, 1984, 176,242c.
Chemical Abstracts, 102, 1985, 26171f.

Primary Examiner—Donald E. Czaja
Assistant Examiner—Goeffrey L. Knable

[57] ABSTRACT

Rubbery high trans-high vinyl diblock copolymers, blends of rubbery high trans copolymers and rubbery high vinyl polymers, and mixtures (alloys or blends) of said diblock copolymers, high trans copolymers and high vinyl polymers are useful in producing tire treads exhibiting good processibility, good rolling resistance, skid resistance and abrasion resistance. The high trans block or copolymer comprises a copolymer of butadiene-1,3 and styrene and/or isoprene and the high vinyl block or polymer comprises polybutadiene or copolymers of butadiene and styrene and/or isoprene. These di-block copolymers, copolymers and polymers are made by solution polymerization. The diblock copolymer may be made by copolymerizing butadiene and styrene and/or isoprene using a Ba, Ca or Sr alcoholate, $R_2Mg$ and $R_3Al$ to from about 60 to 95% conversion to a high trans block and then adding (optionally more Bd with or without Sty and/or isoprene) a strong Lewis base and a Na, K or Rb alkoxide and continuing the polymerization to completion to obtain the high vinyl block of the di-block copolymer.

4 Claims, 4 Drawing Figures

TIRE TREAD HAVING HIGH TRANS BUTADIENE BASED ELASTOMERIC BLOCK COPOLYMERS AND BLENDS

This is a divisional application of Application Ser. No. 06/723,385 filed Apr. 15, 1985, now U.S. Pat. No. 4,616,065.

This invention relates to high trans-1,4-butadiene based elastomeric or rubbery diblock copolymers and blends useful for making improved tire treads.

It is an object of this invention to provide a high-trans-1,4-butadiene based diblock copolymer or blend useful in tire treads.

It is another object of this invention to provide a method for making a high trans 1,4-butadiene based diblock copolymer.

It is a further object of this invention to provide a tire with a tread of a high trans-1,4-butadiene based elastomer diblock copolymer and blends of the same.

Figure 2:
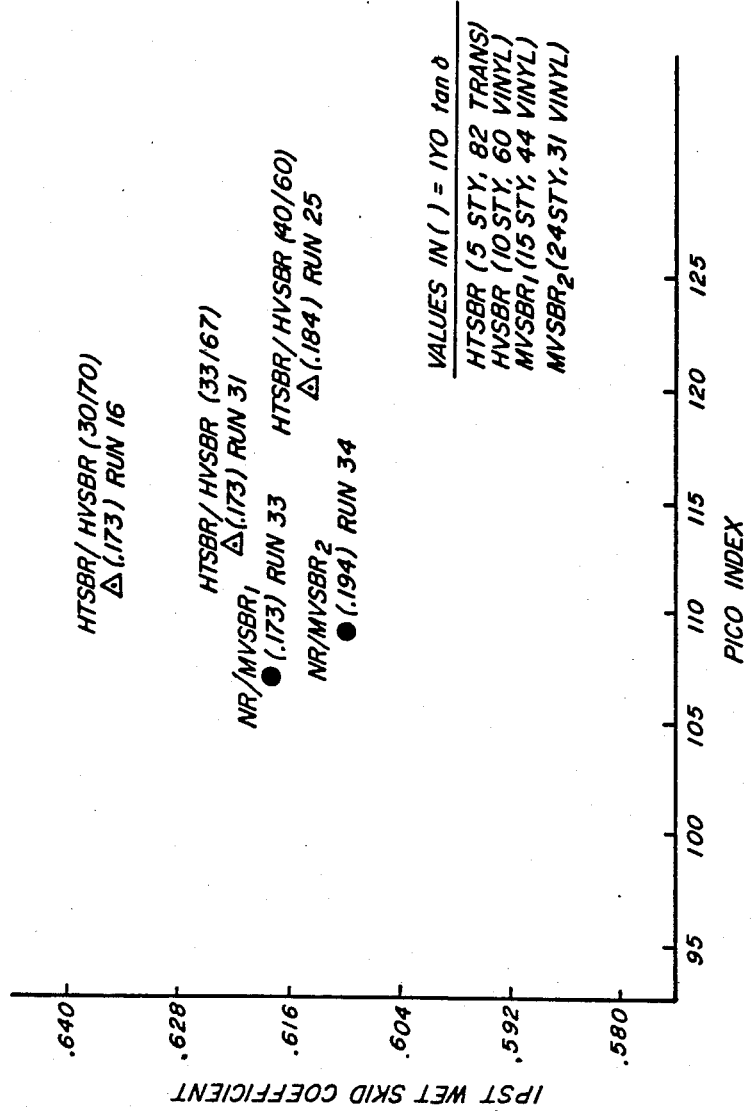
Figure 3:
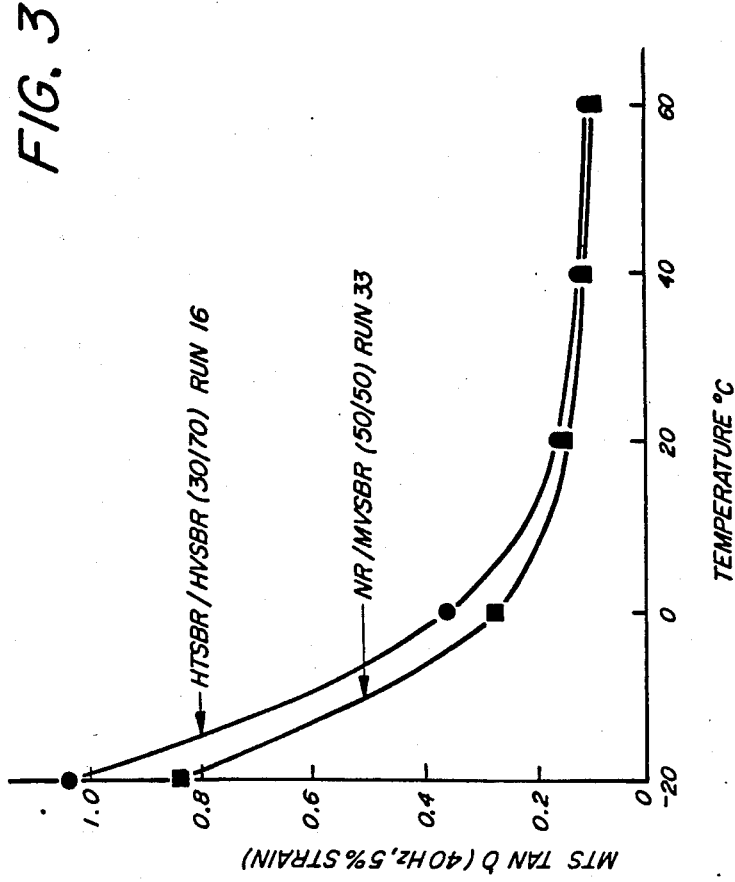
Figure 4:
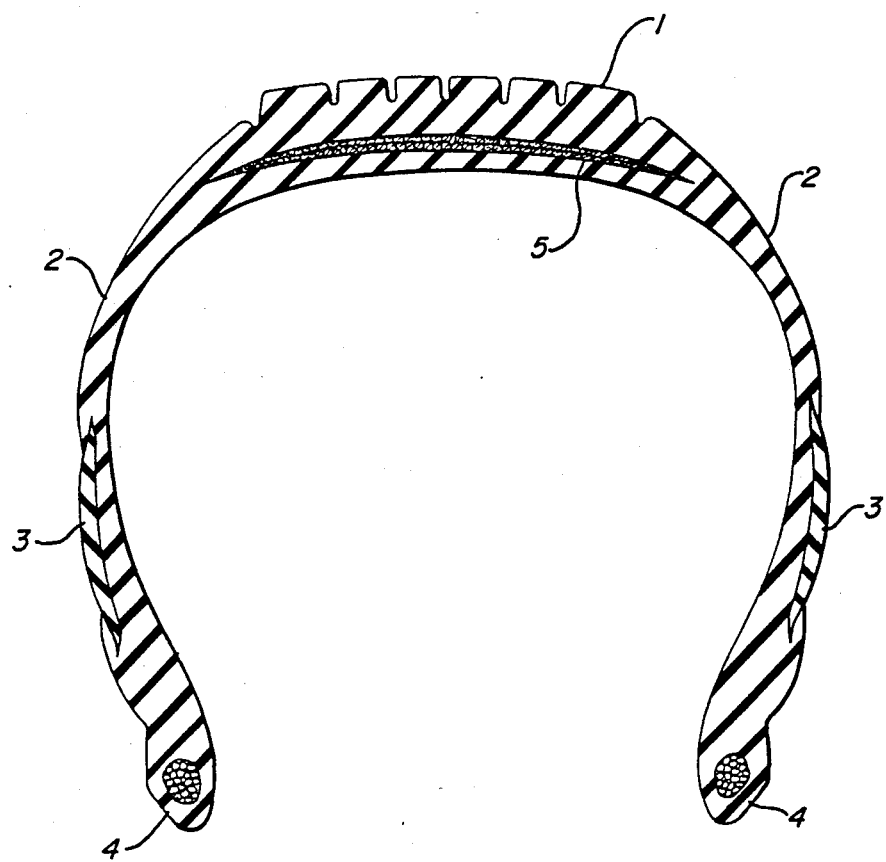

These and other objects and advantages of the present invention will become more apparent to those skilled in the art from the following detailed description, examples and accompanying drawings in which FIG. 1 compares the tread properties of HTSBR/HVSBR blends and other HVSBR blends with respect to IPST (Instrumented British Portable Skid Tester) wet skid coefficient versus Pico Index, FIG. 2 compares the wet skid coefficients and Pico abrasion indices for blends of HTSBR/HVSBR and NR/MVSBRs (50/50), FIG. 3 is a graph showing the temperature dependence of the loss tangent for mechanical blends and FIG. 4 is a vertical cross sectional view of a tire embodying the compositions of the present invention.

HTSBR: High trans styrene-butadiene rubber
HVSBR: High vinyl styrene-butadiene rubber
LiBR: Lithium polymerized butadiene
LVSBR: Low vinyl styrene-butadiene rubber
NR: Natural rubber
MVSBR: Medium vinyl styrene-butadiene rubber

SUMMARY OF THE INVENTION

According to the present invention, novel styrene-butadiene diblock copolymers are prepared having as one component low (not over about 8%) vinyl, high trans-1,4 polybutadiene placements (overall content of from about 75 to 85%) and as a second component high vinyl polybutadiene placements (about 40 to 80%). Either this block copolymer alone, or a blend of the homopolymers comprising the block segments, leads to improved tire tread compositions. Specifically, the compositions of this invention are of two general types: (1) block copolymers of the AB-type, [HTSBR (Tg, glass transition, less than about −70° C.) -b- HVSBR or HVBR (Tg greater than about −70° C. and not above about −35° C.) where b represents block polymer], and (2) mechanical blends of HTSBR and HVSBR or HVBR (high vinyl butadiene rubber).

The all-synthetic tread compounds based on the materials of this disclosure have a unique combination of properties: good extrusion processibility, low rolling resistance, high traction and high abrasion resistance. The good traction properties are a result of the appropriate structure of the high Tg segment (HVSBR), whereas the low Tg high trans-1,4 segment of the HTSBR contributes abrasion resistance, strength and reduced rolling resistance. The structural parameters that effect these properties are the styrene content and polybutadiene microstructure of the block or blend components, their molecular weight and the block or blend ratio. Polymers with different molecular architecture and molecular weight distribution (MWD) can readily be prepared using the polymerization processes described here.

The HTSBR is described in the prior art by having predominantly high trans-1,4 structure together with extremely low vinyl contents (about 2 to 4%). Accordingly, these polymers exhibit a low level of crystallinity (unstretched and uncompounded). They also show a substantial improvement in both cured and uncured properties of the rubbers obtained over rubbers prepared by other initiator (catalyst) systems such as organolithiums.

The block copolymers and blends of this invention have a high trans SBR (high trans, low vinyl) component blended with, or molecularly bonded to, a high vinyl SBR or BR. The amount of HTSBR can vary from about 25 to 80 wt. % in the diblock copolymer, blend or mixture. The total overall bound styrene content in the block copolymer, blend or mixture varies from about 5 to 20 wt. % and the total overall vinyl content in the block or blend ranges from about 30 to 60%. When used as the only rubber component in a passenger tire tread compound, the elastomer composition of this invention provides improved wear resistance and improved traction with nearly the same rolling efficiency (as measured by laboratory instruments) as do blends of NR with solution SBR's (about 50% vinyl).

The process for the preparation of HTSBR-b-HVSBR copolymers consists of the use of a barium salt of an alcohol, in combination with an organo magnesium compound and an organo aluminum compound or an organomagnesium-organoaluminum complex, for copolymerization of butadiene and styrene in cyclohexane to a conversion of from about 60 to 95%, preferably about 85%, to form HTSBR (block A) followed by the addition of more monomer(s) if desired, an alcoholate of sodium (preferred), potassium or rubidium or mixture thereof and a strong Lewis base for the formation of HVSBR (block B). The resulting SBR has a predominantly random distribution of styrene units in each block. The high content of trans-1,4 placements in block A gives rise to some crystallinity as observed by DSC (Differential Scanning Calorimetry) and crystalline melting temperatures that can be decreased to near or below room temperature (about 25° C.) by adjustments of the trans-1,4 content and the level of styrene. The resulting polymers have reduced cold flow and excellent processibility.

There is evidence from molecular weight and MWD data of the diblock copolymer that a high proportion of block polymer is formed with this catalyst system. Both the diblock copolymers as well as the corresponding blends of HTSBR/HVSBR exhibit two transitions in the DSC curves for both the uncured polymer and its black filled vulcanizate. The values of the glass transition temperatures correspond to the respective components (HTSBR and HVSBR) and indicate their incompatibility.

For the HTSBR portion, described in this invention, part or all of the styrene may be replaced with isoprene. For the HVSBR portion described in this invention, the styrene monomer may be replaced with butadiene-1,3; isoprene and styrene mixtures; or butadiene-1,3, isoprene and styrene mixtures. Under the polymerization conditions described for preparing the HVSBR the isoprene develops high vinyl groups (1,2+3,4).

The HTSBR is made using a barium, magnesium and aluminum complex in solution in a hydrocarbon solvent.

For the blend, the HVSBR or HVBR is made using an anionic organolithium initiator and a strong Lewis base in solution in a hydrocarbon solvent.

Additionally, the HTSBR-b-HVSBR diblock copolymer may be used as an alloying agent for the separately prepared HTSBR copolymer and the HVSBR copolymer or HVBR.

In making the blends, the polymeric solutions can have antioxidants added, the polymerizations are terminated with an alcohol or water and the solvent removed. The dried polymers are then mechanically (dry) blended or mixed (in a Banbury or on a rubber mill, etc.). Alternatively, the polymeric solutions can be terminated, and the polymeric solutions can then be blended or mixed, antioxidants added, and solvent removed to obtain a dry rubber blend.

The HVSBR copolymer or HVBR polymer, when prepared with a aono-lithium hydrocarbon initiator for use in the blends, can be chain extended to improve processibility. The HTSBR used in the blends also has the capability of being chain extended to increase molecular weight and broaden molecular weight distribution.

Due to the nature of the initiators, promoters, cocatalysts, polymerization systems used, and possibly due to impurities, the block copolymers can contain some copolymemrs or homopolymers.

DISCUSSION OF DETAILS AND PREFERRED EMBODIMENTS

The barium (preferred), calcium or strontium alcoholate or alkoxide salt or mixture of such salts may be made by reacting an alcohol, optionally additionally including a small amount of water, with Ba, Ca and/or Sr metal. The reaction can be conducted in liquid $NH_3$ or amine solvent at a temperature of from about $-100°$ C. up to the boiling point of the solvent or above the boiling point under pressure. After the reaction, the $NH_3$ or amine can be removed from the salt by distillation, vacuum evaporation and solvent extraction. Methods of making the barium alkoxide salts, such as barium t-alkoxide salts, which also will be applicable to the corresponding Ca and Sr salts, are shown in U.S Pat. Nos. 3,992,561; 4,260,519 and 4,260,712.

Examples of aliphatic alcohols to use to make the Ba, Ca and/or Sr alkoxides or alcoholates are methanol, ethanol, propanol, isopropanol, n-butanol, cyclopentanol, cycloheptanol, cyclohexanol, s-butanol, t-butanol, allyl alcohol, pentanol, hexanol, octanol, and decanol and so forth and mixtures of the same. These alcohols can have from 1 to 10 carbon atoms in each alkoxide moiety which may be the same or different. Examples of such alcoholates are calcium diethoxide, di(t-butoxy) strontium, di(t-butoxy) barium, di(isopropoxy) barium, di(cyclohexyloxy) barium and so forth. It is preferred to use a more acidic alcohol like allyl alcohol in making the alkali metal salt such as di(allyloxy) barium, barium diallyl oxide, since it is not necessary to use ammonia or an amine to facilitate reaction between the metal and alcohol nor to conduct a separate step of removing the ammonia or amine to reduce the nitrogen content of the metal alcoholate before use as a co-initiator or co-catalyst.

The organoaluminum compounds used in the practice of the present invention are alkyl and cycloalkylaluminum compounds. These compounds can be prepared by reacting alminu, metal with an olefin in the presence of hydrogen. Another method, for example, comprises the reaction:

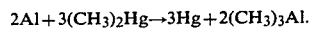

$$2Al + 3(CH_3)_2Hg \rightarrow 3Hg + 2(CH_3)_3Al.$$

Other methods can be used. See "Aluminum Alkyls," Texas Alkyls, Copyright 1976 by Stauffer Chemical Company, Westport, Comaecticut, 71 pages including the bibliography shown therein and "Encyclopedia Of Polymer Science And Technology," Vol. 1, 1964, Interscience Publishers a division of John Wiley & Sons, Inc., New York, Pages 807 to 822. These organoaluminum compounds have the general formula $R_3Al$ where R is an alkyl radical or cycloalkyl radical, which may be the same or different, of from 1 to 20, preferably of from 1 to 10, carbon atoms. Mixtures of these organoaluminum compounds can be used. Examples of such compounds are trimethyl aluminum, triethyl aluminum (preferred), tri-n-propyl aluminum, triisopropyl aluminum, pentyl diethyl aluminum, 2-methylpentyl-diethyl aluminum, tri-n-butyl aluminum, triisobutyl aluninum, dicyclohexylethyl aluminum, tri-n-pentyl aluminum, tri-n-hexyl aluminum, tri-n-octyl aluminum, tri (2-ethylhexyl) aluminum, tricyclopentyl aluminum, tricyclohexyl aluminum, tri (2,2,4-trimethylpentyl) aluminum, tri-n-dodecyl aluminum and tri (2-methylpentyl) aluminum and the like.

The organomagnesium compounds used in the practice of the present invention are alkyl and cycloalkyl magnesium compounds. These compounds can be prepared by the action of $R_2{}^IHg$ on magnesium, the reaction being facilitated by the presence of ether. They, also, aay be prepared by allowing olefins to react under pressure at about 100° C. with magnesium metal in the presence of hydrogen. Please see "Organometallic Compounds," Coates et al, Vol. 1, 1967, 3rd Ed., Methuen & Co. Ltd., London. These organomagnesium compounds have the general formula $R_2{}^IMg$ where $R^I$ is an alkyl radical or cycloalkyl radical, which may be the same or different, of from 1 to 20, preferably of from 1 to 10, carbon atoms. Mixtures of these organomagnesium compounds can be used. Examples of such compounds are dimethyl magnesium, diethyl magnesium, dipropyl magnesium, di-n-butyl magnesium, di-sec-butyl magnesium, di-n-amyl magnesium, methyl-ethyl magnesium, n-butyl ethyl magnesium, n-propylethyl magnesium, di-n-hexyl magnesium, dicyclohexyl magnesium, cyclohexylethyl magnesium, didecyl magnesium, di-ter-butyl magnesium and didodecyl magnesium and the like. n-butyl ethyl magnesium and n-butyl-sec-butyl magnesium are preferred.

Organo Mg-Al complexes can be used instead of mixtures of Mg and Al compounds. One method of preparation is to add the organoaluminum compound to a reactor containing the reaction products of organic halides with magnesium in hydrocarbon solvent. After filtration of the reaction mixture, there is obtained a solution of the complex containing little soluble halides. Please see Malpass et al, "Journal of Organometallic Chemistry," 93 (1975), pages 1 to 8. These complexes will have the general formula $R_mAl_n \cdot R_p{}^IMg_q$ where the mole ratio of Al to Mg is as set forth herein, where m, n, p and q are numbers sufficient to satisfy the required valences of the radicals and atoms and where R and $R^I$ are alkyl or cycloalkyl radicals, which may be same or different, as described above.

In the catalyst composition the mole ratio computed as metal of magnesium to aluminum is from about 105:1 to 1.5:1, and the mole ratio computed as aetal of barium, calcium and/or strontium to magnesium is from about 1:10 to 1:2.

Methods for making high trans butadiene-styrene rubbery copolymers using the alkali metal salts, organomagnesium compounds and organoaluminum compounds are disclosed in U.S. Pat. Nos. 4,297,240; 4,302,568 and 4,307,218. If it is desited to achieve quantitative polymerization in reasonable reaction times when making only HTSBR, then between about 80 and 90% conversion of monomers to copolymer, a strong Lewis base, preferably N,N,N',N'-tetramethylethylene diamine (TMEDA), and an alkoxide of Na, K, or Rb (preferably rubidium t-amylate to speed the reaction) are added to obtain 100% conversion in from about 5 to 6 hours.

In making the high vinyl block attached to the high trans SBR blocks additional butadiene-1,3 or butadiene-1,3 and styrene may be added to the living high trans copolymerization media along with an alkali metal alcoholate or alkoxide and a strong Lewis base.

The alkali metal alcoholate or alkoxide used in aaking the high vinyl portion of the block copolymer is a sodium (preferred), potassium, or rubidium alkoxide or mixture thereof where the organic moieties of the alkoxide group have from 3 to 6 carbon atoms. Examples of some alcohols used to make these alkoxides are propyl alcohol, isopropyl alcohol, butyl alcohol, tert-butyl alcohol, tert-amyl alcohol, isoamyl alcohol, amyl alcohol, hexyl alcohol, cyclopentanol and cyclohexanol. Mixtures of these metal alkoxides can be used. Different alkoxides may require more or less of the alkoxide to be used to obtain the desired results. Of the alkoxides it is preferred to use sodium t-amylate. It, also, is preferred that the strong Lewis base be selected from the group consisting of tertiary aliphatic amines and aliphatic ethers and mixtures of the same. Examples of strong Lewis bases are triglyme (triethylene glycol dimethyl ether), tetraglyme, diglyme (diethylene glycol dimethyl ether), TMEDA, dimethoxyethane and 1,2-dipiperidino ethane. Of these materials it is preferred to use TMEDA.

The alkali metal alcoholate and strong Lewis base are used in minor amounts by weight based on the weight of the monomers sufficient to get the desired vinyl content of the HVSBR or HVBR block. Both are necessary to get the desired high vinyl content when making a block copolymer in the presence of (residual) initiator or catalyst compounds remaining from the high trans copolmerization. Without TMEDA, maximum vinyl contents of 40-45% are obtained when only Na t-amylate is used to modify the Ba-Mg-Al catalyst or initiator system. With TMEDA and Na t-amylate, vinyl contents up to 80-85% are possible. The amount of vinyl structure is dependent primarily on $Na/R_2Mg$ mole ratio, and only shows a slight dependence of polymerization temperature (10°-50° C.) and/or $TMEDA/R_2Mg$ mole ratio (0.3 to 1.0).

The lithium anionic initiator used when a separately prepared HVSBR or HVBR is intended for blending or mixing should be a soluble mono- or di- lithium hydrocarbon having from 2 to 40 carbon atoms. Examples of some lithium anionic initiators are isopropyllithium, n-butyllithium, sec-butyllithium, t-butyllithium, isobutyllithium, amyllithium, hexyllithium, ethylhexyllithium, tert-octyllithium, n-decyl-lithium, naphthyllithium, 4-butyl-phenyllithium, p-tolyllithium, 4-phenylbutyllithium, cyclohexyllithium, 4-butyl-cyclohexyllithium, 4-cyclohexyl-butyllithium, 1,10-dilithiodecane, 1,20-dilithioeicosane, 1,4-dilithio-cyclohexane, 1,4-dilithio-2-butene, 1,8-dilithio-3-decane, 1,2-dilithio-1,2-diphenyl-ethane, 1,2-dilithio-1,8-diphenyloctane, 4,4'-dilithiobiphenyl, dilithiopolyisoprene (having from 2 to 8 isoprenyl units) and dilithiopolybutadiene (having from 2 to 8 butadienyl units) and the like and mixtures thereof. Preferably, the initiator has the formula RLi where R is an alkyl group of from 2 to 10 carbon atoms and mixtures thereof. It is even more preferred to use n-butyl lithium and/or sec-butyl lithium. The lithium compound is used in a minor amount by weight, as compared to the weight of the monomers, sufficient to provide a high molecular weight rubbery polymer or copolymer. In general there may be used from about 0.0003 to 0.001 mole of initiator computed as lithium per 100 grams of total butadiene-1,3 and styrene and/or isoprene monomer(s). Dilithium or polyfunctionally derived organolithium compounds such as are described in U.S. Pat. No. 4,409,368 can also be used. In the separate organolithium initiated polymerization to make the HVSBR or HVBR by itself, the strong Lewis base is used in an amount of from about 0.01 to 1% by weight based on the weight of the monomers in the polymerization mixture.

Solvents for use during solution polymerizations are aliphatic hydrocarbons like hexane, heptane, octane, nonane, decane, dodecane, cyclohexane, cycloheptane, cyclooctane and the like and mixtures thereof. Hexane and cyclohexane are preferred solvents to use. In solvent polymerization it is preferred to operate on a basis of not over about 15 to 20% polymer solids concentration in the solvent to enable ready heat transfer, to facilitate stirring and to aid in processing. Temperatures used during polymerization are from about 25° to 80° C. Times will depend on the desired degree of conversion to copolymer but in general will be from about 4 to 6 hours.

Polymerizations of course, shoud be conducted in a closed reactor, fitted with a stirrer, heating and cooling means, with means to flush with or pump in an inert gas such as nitrogen, neon, argon and so forth in order to polymerize under inert or non-reactive conditions, with means to charge monomers, solvent, initiators, cocatalysts and modifiers, venting means and with means to recover the resulting copolymer and so forth.

An active polymer chain extender or coupling agent for the lithium polymer of the blend, if used, can be $SnX_4$ where X is halogen, e.g., tin fluoride, chloride, bromide or iodide or mixture of the same. Stannic chloride or tin (IV) chloride is the preferred coupling agent. Other coupling agents can be used such as $SiX_4$ and $GeX_4$. The coupling agent is used in an amount of not above about 50% of the stoichiometric amount required to react with all of the Li atoms in the lithium hydrocarbon initiated polymerizations. Divinyl benzene and diisopropenyl benzene or mixture thereof, also, can be used in small amounts for diblock copolymers prepared with the Ba-Al-Mg initiators. Polymers prepared with lithium catalysts or initiators can be chain extended or branched also with divinyl benezene or diisopropenyl benzene. The coupling agent can serve partly to chain extend or branch the living copolymer or to form star copolymers and is added after substantially complete conversion. These coupling agents are of help in preventing cold flow. However, in the presence of acids used during rubber compounding the Sn-C bond, for example, may be broken to some extent.

The polymerizations may be terminated by adding water, alcohol or other agent to the polymeric solutions. Conversion of the metal ions to sulfates renders them passive. After the polymers have been recovered and dried, a suitable antioxidant such as 2,6-di-tert-butyl-p-cresol or other antioxidant may be added to the same. However, the antioxidant may be added to the polymeric solutions before they are stripped of solvent.

The di-block copolymers, blends and so forth produced by the methods of the present invention can be compounded and cured or vulcanized in the same manner as other rubbery polymers. For example, they can be mixed with sulfur or sulfur furnishing materials, peroxides, reinforcing carbon blacks, $SiO_2$, $TiO_2$, $Sb_2O_3$, stearic acid, ZnO, zinc stearate, red iron oxide, other rubber fillers and pigments, tetramethyl or ethyl thiuram disulfide, benzothiazyl disulfide and rubber extending or processing mineral or petroleum oils and the like. Stabilizers, antioxidants, UV light absorbers and other antidegradants can be added to these polymers. They, also, can be blended with other elastomeric or rubbery polymers like natural rubber, cispolyisoprene, butyl rubber, cis-polybutadiene, butadieneacrylonitrile copolymer, butadiene-styrene-acrylonitrile terpolymers, polychloroprene, solution or emulsion SBR, polyurethane elastomers and so forth. Ihe addition to the polymers of this invention of small amounts, e.g., about 10 phr of chloro- or bromo-butyl rubber may improve further the wet friction coefficient of a tire tread embodying these polymers.

While the rubbery di-block copolymers and blends of the present invention are particularly useful in making a carbon black reinforced compounded tire tread for a pneumatic tire such as a bias, belted bias or radial passenger car tire, they can be used in other applications. For example, the di-block copolymers and blends produced by the methods of the present invention, also, can be used in making truck tires, off-the-road tires, protective coatings for fabrics, athletic (tennis) balls, bushings (silentblocs), weather strips, windshield wiper blades, body and engine mounts for automobiles, gaskets, belts, hose, shoe soles and electric wire and cable insulation, and as plasticizers and polymeric fillers for other plastics and rubbers. With large amounts of sulfur, hard rubber products can be made In making tires, they are built in the customary fashion in which a tire tread of a vulcanizable rubbery polymeric composition of this invention is applied to a green tire carcass and cured or vulcanized in a mold. The vulcanizable polymeric tread composition can be extruded or otherwise formed and vulcanized (pre-cured). The pre-cured tread stock can then be applied to a cured, cleaned and adhesive coated cured tire carcass and cured to the same (as in re-treading). The rubber composition, also, can be prepared as a master batch.

The following examples will serve to illustrate the present invention with more particularly to those skilled in the art.

The polymerizations used to make the polymers of the Examples were carried out in argon atmospheres in capped glass bottles fitted with rubber gasket inner liners. Solvents were purified by passing the liquids through columns of 5Å molecular sieves (Linde). Butadiene-1,3 (99 mol %) was purchased from Phillips Petroleum Company. Purification was accomplished by passing the material through columns of 3Å molecular sieves. Styrene was purchased from Gulf Oil Chemical and El Paso Products, Texas, and purged with a stream of nitrogen.

In charging styrene and butadiene-1,3 polymerizations with Ba-Mg-Al, the order of addition of materials was solvent first, then mononer(s), next the Mg-Al alkyls, (triethyl aluminum and butyl ethyl magnesium and then the barium salt, barium di(allyloxide) (Step 1). In preparing diblock polymers, butadiene-1,3, immediately followed by Na t-amylate and IMEDA (Step 2) were added to the solution of polymeric carbanions formed in Step 1 above.

The copolymer composition and percent polybutadiene microstructure were determined by IR (Infrared analysis) and from $^{13}C$ NMR (Nuclear Magnetic Resonance) for certain polymers. The microstructure values determined from IR and $^{13}C$ NMR were essentially identical. The vinyl content was determined using the 905 $cm^{-1}$ IR absorption band. High performance gel permeation chromatography (HPGPC) was carried out on the polymers using a Waters Gel Permeation Chromatograph. Solutions at 1 wt. % were injected onto columns at a flow rate of 1 ml/minute. The instrument oven and the differential refractometer were at 50° C. The column set configuration used, as designated by Waters Associates, was $$1 \times 10^6 Å + 1 \times 10^5 Å + 1 \times 10^4 Å 1 \times 10^3 Å.$$

All thermal transitions were obtained by DSC using a heating rate of 20° C./minute. Glass transition temperatures were determined from the midpoint of the inflection in the plot of differential heat flow with temperature in the heating curve at a heating rate of 20° C./minute, obtained after first cooling the sample from 125° C. to −150° C.

TREAD COMPOUND FORMUIATION

Tread rubber compositions were prepared according to the formulation shown in Table I, below. Oil content was varied from 5 to 15 phr (parts per hundred parts of rubber) to provide Shore A hardness values of 62±2. The rubber compounds were mixed on a two-roll, 12-inch mill and then cured with N-tert-butyl-2-benzothiazole sulfenamide (TBBS)/sulfur, whereas HTSBR blends and block copolymers were cross-linked with a N-cyclohexyl-2sulfenamide (CBS)/sulfur system.

TABLE I

| Tread Vulcanizate Compound Formulation | |
|---|---|
| | phr |
| Polymers | 100 |
| N-339 Black (High Abrasion Furnace Carbon Black) | 45 |
| Circosol 4240/42XH Oil (naphthenic oil)(Sun Oil) | 10 ± 5 |
| Zinc Oxide | 3 |
| Stearic Acid | 2.5 |
| Antioxidant N—(1,3-dimethylbutyl)-N'—phenyl-p-phenylene diamine | 1.2 |
| N—tert-buty-2-benzothiazole sulfenamide (TBBS) or N—cyclohexyl-2-benzothiazole sulfenamide (CBS) and Sulfur | Variable (about 3. to 7.) |

HTSBR/HVSBR blends in tread compounds (Table I) exhibit outstanding processing properties. This refers to mill blending, ingredient dispersion and extrusion. At nearly the same compound Mooney viscosity (60) and shear rate (100 $sec^{-1}$), a tread compound containing a blend of HTSBR/HVSBR (30/70), see Run No. 16 of this application, showed viscosity and relaxed die swell, easured by a Monsanto Processability Tester at 100° C., 0.059 inch capillary L/D=5, that were both 16% lower than a corresponding tread compound containing emulsion SBR 1500.

The extrusion characteristics, as measured by Garvey Die Extruder (ASTM D2230-83), of the above blend are compared to SBR 1500 in Table IA. It can be seen from the values of the Garvey Die Extrusion indices that the blend gave a smoother surface appearance. The weight/length ratio of the Garvey Die for zero tension extrusion was higher for SBR 1500 which is consistent with its observed higher die swell.

TABLE IA

| Elastomer | Garvey Die Extrusion Data | | | | | | |
|---|---|---|---|---|---|---|---|
| | Rating (1) | | | | Output (1 min) | | |
| | Swelling | Edge | Surface | Corners | Wt. | Length | Wt/length |
| HTSBR/HVSBR (Run No. 16) | 4 | 4 | 4 | 4 | 22 | 33 | 0.67 |
| SBR 1500 | 2 | 3 | 3 | 3 | 39 | 35 | 1.11 |

(1) On a scale of 1-4; higher values represent a better rating

TREAD VULCANIZATE PROPERTIES

These were determined as follows:

Loss Tangent Delta (Tan δ)

Tan δ was measured by means of an Instrumented Yerzley Oscillograph (IYO) at room temperature (ca.25° C.) and 5 Hertz. The Yerzley Oscillograph is a good predictor of twin-roll rolling resistance of tire tread material formulations. The lower the tan δ value, the lower the rolling resistance.

Wet Skid Coefficient of Friction

An instrumented British Portable Skid Tester (IPST) was used to measure the wet coefficient of friction ($\mu$-wet) on a smooth concrete surface. All wet-skid coefficient values are relative to a normalized standard $\mu$-wet value of 0.600 for a 65/35 E-SBR/cis-BR carbon black filled tread vulcanizate formulation. The test shows good correlation of $\mu$-wet with wet tire traction data (peak wet traction at 96.6 km/hour). The higher the $\mu$-wet, the better the traction performance on a wet concrete road. E-SBR: Emulsion styrene butadiene copolymer rubber, ca. 23.5% styrene. cis-BR: ca. 93% cis-polybutadiene.

Pico Abrasion Index

This test was run as described in ASTM D2228.

Dynamic Mechanical Tester

Loss tangent was measured on double-lap shear samples with a Material Testing System (MIS) at 40 Hz and 5% strain.

Blends

In the blends in the examples the polymer and copolymers were mechanically (dry) blended.

EXAMPLE 1

A HTSBR-b-HVSBR diblock copolymer (Table II, Run 1) was prepared as follows: A Ba-Mg-Al initiator (described in U.S. Pat. No. 4,297,240) was used to copolymerize butadiene and styrene in cyclohexane at 60° C. to a conversion of 72% in 5 hours (see Table II). The resulting solution contained a mixture of unreacted monomers and polymer carbanions of HTSBR (6 wt. % styrene). To form the HTSBR-b-HVSBR diblock copolymer, an additional quantity of butadiene and solutions of Na t-amylate and TMEDA in cyclohexane were charged to the reactor containing the above non-terminated solution of HTSBR. The carbanions of HTSBR were used to initiate the copolymerization of butadiene with styrene to 94% conversion. HPGPC chromatograms of the diblock copolymer and the corresponding HTSBR precursor were used to establish the formation of the diblock copolymer. A certain fraction of HTSBR and/or HVSBR is present along with block copolymer. About 75% by weight of block copolymer was formed based on number-average molecular weights of HTSBR and block copolymer.

TABLE II

| Preparation[a] of a HTSBR-b-HVSBR Diblock Copolymer with Ba—Mg—Al | | | | |
|---|---|---|---|---|
| Run No. | Diblock Copolymer Composition[b] | Pzn. Temp., °C. | Modifier[c] | Monomers[d] (grams) |
| | | | Na t-amylate | TMEDA |
| — | HTSBR | 60 | — | — | Bd (38.1) Styrene (6.3) |
| 1 | HVSBR | 50 | 0.44 | 0.35 | Unreacted Monomers (from Step 1): Sty (4.4) Bd (8.0) Additional Bd (55.0) Total Bd (63.0) |

| Run No. | mM/100 g Monomers | | | % Conv. (hrs.) | Wt. % Styrene | | % Vinyl |
|---|---|---|---|---|---|---|---|
| | Ba | Mg | Al | | Charged | Found | |
| — | 0.18 | 0.57 | 0.04 | 72 (5) | 14.2 | 6 | 3 |
| 1 | — | — | — | 94 (1) | — | 7 | 56 |

[a] polymerized in cyclohexane (338 g)
[b] ratio (HTSBR/HVSBR) = 45/55 (charged), 34/66 (found)
[c] mM per 100 g monomers, mole ratios of 0.77(Na/Mg) and 0.61 (TMEDA/Mg)
[d] total Bd = 93.1 grams and styrene = 6.3 grams
Bd = butadiene-1,3

EXAMPLE 2

HTSBR and HVSBR rubbers for making blends were prepared as follows: HVSBK (10% styrene, 60% vinyl) was prepared in hexane 30° C. with n-BuLi complexed with TMEDA. The resulting copolymer was chain-extended with SnCl4. HTSBRs were prepared in hexane with a barium alcoholate in combination with an organomagnesium and organoaluminum complex (see Example 1, above and Runs 4, 5 and 6). In this preparation, the final conversion of a monomer mixture of butadiene/styrene (90/10) to polymer was 89% in 6 hours (70° C./4 hrs, then 82° C./2 hrs). The mole ratios of barium salt to dialkylmagnesium and dialkylmagnesium to triethylaluminum were 0.33 and 3.9, respectively.

In another preparation a mixture in cyclohexane of Rb t-amylate and TMEDA was added to a solution of carbanions of HTSBR obtained at 85% conversion after 4.5 hrs polymerization time at 65° C. Polymerization of the unreacted butadiene and styrene continued to 100% conversion in only one additional hour. The resulting polymer (see Run 6-1 in Table IV, Example 3) contained both HTSBR and medium vinyl SBR (15 wt. %), mainly as a diblock polymer. The mole ratios of Rb salt to $R_2Mg$ and TMEDA to $R_2Mg$ were 2.8 and 1.3, respectively.

EXAMPLE 3

Characterization data of three AB-type diblock styrene-butadiene copolymers (Runs 1, 2 and 3), prepared according to Example 1, are given in Table III, below. Variations in diblock copolymer structure were obtained by varying the amount of Na t-amylate relative to fixed levels of TMEDA and dialkylmagnesium. Vinyl content in HVSBR (column 7, Table III) increased from 56 to 72% as the mole ratio of $Na/R_2Mg$ increased from 0.8 to 1.3 at fixed levels of TMEDA and $R_2Mg$ (TMEDA/$R_2Mg$=0.6). Without TMEDA, vinyl content is only 20% for a mole ratio of $Na/R_2Mg$ equal to 1.0. Table IV, below, provides corresponding characterization data of three mechanical blends (Runs 4, 5, 6 and 6-1) of HTSBR and HVSBR, prepared according to Example 2. Additional structural data of various solution SBR's (Runs 7-15) which may be used in blends with NR or with each other are given in Table V, below. HTSBR (Run 7) is included for comparative purposes.

In the block copolymers as well as the mechanical blends of this invention, two distinct individual glass transitions are observed in the DSC thermograms, corresponding to the respective block or blend components. Black filled vulcanizates containing these rubbers show similar transitions.

TABLE III

Characterization Data of Uncompounded and Uncured HTSBR-b-HVSBR Polymers

| | Polymer Composition | | | | | |
|---|---|---|---|---|---|---|
| | HTSBR | | | HVSBR | | |
| Run No. | % Styrene | % Trans | % Vinyl | % Styrene | % Trans | % Vinyl |
| 1 | 6 | 82 | 3 | 7 | 23 | 56 |
| 2 | 5 | 82 | 3 | 7 | 15 | 72 |
| 3 | 7 | 77 | 4 | 5 | 23 | 57 |

| Run No. | Wt. % HTSBR[a] | Crystalline Melting Temp., °C. | Tg, °C. By DSC (midpoint) HTSBR | Tg, °C. By DSC (midpoint) HVSBR | Mw/Mn (by HPGPC) |
|---|---|---|---|---|---|
| 1 | 34 | 21 | −78 | −46 | 2.47 |
| 2 | 39 | 21 | −80 | −31 | 2.23 |
| 3 | 45 | 8 | — | — | 2.46 |

[a]total wt. % HTSBR (as block copolymer and homopolymer)
Mw/Mn = H.I. or heterogeneity index

TABLE IV

Characterization Data of Uncompounded and Uncured Comparative Blends of HTSBR and HVSBR

| Run No. | Blend Composition HTSBR | | |
|---|---|---|---|
| | % Styrene | % Trans | % Vinyl |
| 4 | 5 | 82 | 3 |
| 5 | 5 | 82 | 3 |
| 6 | 6 | 80 | 3 |
| 6-1 | 11 | 75 | 8 |

| Run No. | HVSBR % Styrene | HVSBR % Vinyl | Wt. % HTSBR | Tg, °C. By DSC (midpoint) |
|---|---|---|---|---|
| 4 | 13 | 52 | 34 | −80, −43 |
| 5 | 10 | 60 | 40 | −80, −40 |
| 6 | 11 | 60 | 45 | −81, — |
| 6-1 | 10 | 60 | 35# | −77, −40 |

| Run No. | HTSBR Mw/Mn (By HPGPC) | HTSBR Mn (Osmometry) | HVSBR Mw/Mn (By HPGPC) | HVSBR Mn (Osmomotry) |
|---|---|---|---|---|
| 4 | 1.87 | 101,000 | 1.86 | — |
| 5 | 1.87 | 101,000 | 1.67 | 167,000 |
| 6 | 2.07 | 98,000 | 1.69 | 197,000 |
| 6-1 | 3.58 | — | 2.29 | 199,000 |

- This product consists of 85 wt. % HTSBR (5% sty, 81% trans, 3% vinyl) and 15 wt. % MVSBR (44% sty, 41% trans, 34% vinyl) because conversion was carried to 100%. MVSBR from HTSBR portion totals 5.25 phr in blend of HTSBR/HVSBR (35/65).

TABLE V

Characterization Data of Uncompounded and Uncured Solution SBR's Which May Be Used In Blends With NR Or With Each Other

| Run No. | SBR % Styrene | % Trans | % Vinyl |
|---|---|---|---|
| 7 | 5 | 82 | 3 |
| 8 | 8 | 51 | 10 |
| 9 | 7 | 42 | 20 |
| 10 | 19 | 51 | 9 |
| 11 | 9 | 36 | 40 |
| 12 | 24 | 42 | 31 |
| 13 | 15 | 34 | 44 |
| 14 | 13 | 30 | 52 |
| 15 | 11 | 26 | 60 |

| Run No. | Tg, °C. By DSC (midpoint) | Mn (Osmometry)[d] | Mw/Mn (By HPGPC) | ML 1 + 4 (100° C.)[e] |
|---|---|---|---|---|
| 7[a] | −79 | 101,000 | 1.87 | 52 |
| 8 | −83 | 125,000 | 1.91 | 58 |
| 9[b] | −78 | 125,000[c] | 1.62 | — |
| 10 | −72 | 163,000 | 2.69 | 65 |
| 11 | −61 | 150,000[c] | 1.46 | — |
| 12[b] | −52 | 174,000 | 1.87 | 55 |
| 13[b] | −47 | 169,000 | 1.60 | 55 |
| 14[b] | −40 | — | 1.86 | 55 |
| 15[b] | −37 | 197,000 | 1.69 | 61 |

[a]crystalline melting temperature was 26° C.
[b]coupled with tetravalent Sn
[c]expected molecular weight based on grams polymer/moles initiator
[d]Number average molecular weight by vapor phase osmometry
[e]Mooney viscosity, large rotor

EXAMPLE 4

The data in Table VI, below, compare cured tread properties of blends of HVSBR and HTSBR with comparative blends containing LVSBR of low styrene contents or BR, Run 18, prepared with an organolithium initiator system. In Run 16, HTSBR obtained at 89% conversion (see Example 2, Run 4) was blended with HVSBR. In Run 16a, HTSBR-b-MVSBR obtained at 100% conversion (see Example 2, Run 6a) was blended with HVSBR. It should be noted that HVSBR blends containing HTSBR as well as HTSBR-b-MVSBR have lower tan δ values with combinations of wet friction coefficient and Pico abrasion index, adjustable by HTSBR content as shown in FIG. 1, that are improved relative to the blends containing low vinyl SBR or BR. These results indicate that the HVSBR blends with HTSBRs, HVSBR blends with HTSBR-b-HVSBR diblock copolymers and mixtures thereof, of this invention have lower rolling resistance with a superior combination of abrasion resistance and wet traction.

TABLE VI

Comparison of Tread Vulcanizate Properties of HVSBR Blends Containing HTSBR and Other Solution Rubbers

| | Blend Composition | | | | | |
|---|---|---|---|---|---|---|
| | LV Solution Rubbers | | | HVSBR | | |
| Run No. | % Styrene | % Trans | % Vinyl | % Styrene | % Vinyl | Wt. % HVSBR |
| 16 | 6 | 80 | 3 | 11 | 60 | 70 |
| 16[a] | 11 | 75 | 8 | 10 | 60 | 65 |
| 17 | 8 | 51 | 10 | 10 | 61 | 70 |
| 18[b] | 0 | 54 | 9 | 11 | 60 | 70 |
| 19 | 5 | 82 | 3 | 10 | 60 | 60 |
| 20[a] | 7 | 42 | 20 | 6 | 62 | 60 |

| Run No. | Tensile Strength (MPa)[c] | Tan δ IYO | μ-Wet IPST | Pico Index |
|---|---|---|---|---|
| 16 | 16.2 | .173 | .635 | 111 |
| 16[a] | 15.8 | .186 | .612 | 95 |
| 17 | 15.0 | .193 | .581 | 101 |
| 18[b] | 13.9 | .197 | .564 | 109 |
| 19 | 17.7 | .202 | .590 | 126 |
| 20[a] | 17.7 | .206 | .601 | 99 |

[a]Compounded with 50 phr N-351 carbon black (high structure, high modulus) instead of 45 phr N-339 carbon black
[b]Polybutadiene
[c]Megapascal

EXAMPLE 5

A medium vinyl SBR (Run 11) was prepared according to Example 2 with nearly the same total bound styrene and vinyl contents as a 30/70 HTSBR/HVSBR blend. The tread vulcanizate properties in Table VII, below, show that the blend of this invention has substantially higher wet skid resistance at nearly the same combination of tan δ and Pico index (compare Runs 16 and 11).

The data in this table show a higher tensile strength for the HTSBR/HVSBR blend than the diblock of LVSBR-b-HVSBR (Run 22, prepared with BuLi and Na t-amylate in the first step followed in the second step by a charge of TMEDA and more butadiene-1,3 and styrene). Again, the blend has higher wet skid resistance with nearly the same loss tangent and Pico index.

TABLE VII

Comparison of Tread Vulcanizate Properties for a HTSBR/HVSBR Blend; a Medium Vinyl SBR; and a LVSBR-b-HVSBR

| Run No. | Structure | Average Composition | |
|---|---|---|---|
| | | % Styrene | % Vinyl |
| 16 | HTSBR/HVSBR Blend[a] | 9 | 43 |
| 11 | MVSBR | 9 | 40 |
| 22 | (8 Sty/15 V/45 trans)-b-(8 Sty/60 V/25 trans)[b] | 8 | 42 |

| Run No. | Tensile Strength (MPa) | Tan δ IYO | μ-Wet IPST | Pico Index |
|---|---|---|---|---|
| 16 | 16.2 | .173 | .635 | 111 |
| 11 | 14.1 | .170 | .547 | 108 |
| 22 | 12.7 | .162 | .616 | 110 |

[a]blend of (6 styrene/3 vinyl)/(11 styrene/60 vinyl), 30/70
[b]wt. % LVSBR (8 styrene/15 vinyl/45 trans) = 40%

EXAMPLE 6

When compared to blends of NR with high vinyl SBR's (see Runs 24, 27 and 30, Table VIII, below), all-synthetic elastomeric blend compositions containing HTSBR/HVSBR have improved wear resistance (high Pico index) at three blend ratios (30/70, Run 16; 40/60, Run 25 and 45/55, Run 28) evaluated while maintaining an acceptable combination of tan δ and wet traction. The data in Table VIII also compare tread vulcanizate properties for similar polymers of HTSBR-b-HVSBR (Runs 23, 26 and 29). They also have higher Pico index values, but have slightly higher values of loss tangent than NR blends containing HVSBR.

Run 31 in Table VIII shows the utility of using a HTSBR-b-HVSBR (62/38) block copolymer, as a polymeric alloying agent, in a blend with a mixture or blend of HTSBR and HVSBR. Again, the data indicate that an improved set of tread properties was obtained.

TABLE VIII

Comparison of Tread Vulcanizate Properties of HTSBR/HVSBR Blends and HTSBR-b-HVSBR Block CoPolymers with Mechanical Blends of NR/HVSBR

| | Tread Rubber Composition | | | |
|---|---|---|---|---|
| Run No. | Low Tg Polymer (Sty/Trans/Vinyl) | | High Tg Polymer (Sty/Vinyl) | Wt. % Low Tg Polymer |
| 16[a] | (6/80/3) | + | (11/60) | 30 |
| 23[b] | (6/82/3) | – b – | (7/56) | 34 |
| 24 | NR | + | (13/52) | 34 |
| 25[a] | (6/80/3) | + | (11/60) | 40 |
| 26[b] | (5/85/3) | – b – | (7/72) | 39 |
| 27 | NR | + | (10/60) | 40 |
| 28[a] | (6/80/3) | + | (11/60) | 45 |
| 29[b] | (7/77/4) | –b– | (5/57) | 45 |
| 30 | NR | + | (10/60) | 45 |
| 31[c] | (6/80/3) + [(2/80/3) | – b – | (13/65)] + (11/60) | 40 |

| Run No. | Tensile Strength (MPa) | Tan δ IYO | μ-Wet IPST | Pico Index |
|---|---|---|---|---|
| 16 | 16.2 | .173 | .635 | 111 |
| 23 | 15.3 | .205 | .562 | 114 |
| 24 | 16.6 | .183 | .613 | 98 |
| 25 | 14.8 | .184 | .614 | 120 |
| 26 | 13.6 | .214 | .613 | 106 |
| 27 | 16.0 | .180 | .637 | 93 |
| 28 | 18.3 | .210 | .573 | 126 |
| 29 | 19.2 | .230 | .545 | 127 |
| 30 | 16.5 | .176 | .636 | 93 |
| 31 | 16.8 | .173 | .622 | 113 |

[a]mechanical blend of HTSBR and HVSBR
[b]HTSBR-b-HVSBR diblock copolymer
[c]blend of HTSBR/HTSBR-b-HVSBR/HVSBR (25/25/50)

EXAMPLE 7

Vinyl containing SBR copolymers and styrene-butadiene block copolymers, prepared using an organoithium initiator system and limited to vinyl contents greater than about 8–10%, when blended 50/50 with NR, are said to be superior to the solution SBRs alone and to emulsion SBR/NR blends in tire treads. The properties of various solution SBRs, having vinyl contents ranging from 9 to 60%, have been compared in blends with NR versus the HTSBR/HVSBR blends of this invention. The results shown in Table IX, below, demonstrate that the blend (Run 16) has nearly equivalent tan δ to the blends of NR (Runs 32–35) with the benefit of an improved combination of wet friction coefficient and abrasion resistance as shown in FIG. 2

The combined properties of low rolling resistance and high wet traction are also demonstrated by the dynamic mechanical behavior of these tread vulcanizates. The temperature dependence of the loss tangent of tread vulcanizates of a HTSBR/HVSBR blend (Run 16) is compared in FIG. 3 with a NR/MVSBR blend (Run 33) tread compound. At 60° C. both vulcanizates show nearly the same tan δ, indicating comparable rolling resistance. At a low temperature, (0° C.) and below, the HTSBR/HVSBR blend shows higher tan δ, indicating higher wet traction than NR/MVSBR.

TABLE IX

Comparison of Tread Vulcanizate Properties of Blends of HTSBR/HVSBR with Various Solution SBR's Blended with NR

| Run No. | Tread Rubber Composition | Blend Ratio |
| --- | --- | --- |
| 16 | HTSBR$^a$ + (11 Sty/60 Vinyl) | 30/70 |
| 32 | NR + (10 Sty/60 Vinyl) | 30/70 |
| 33 | NR + (15 Sty/44 Vinyl) | 50/50 |
| 34 | NR + (24 Sty/31 Vinyl) | 50/50 |
| 35 | NR + (19 Sty/9 Vinyl) | 50/50 |

| Run No. | Tensile Strength (MPa) | Tan δ IYO | μ-Wet IPST | Pico Index |
| --- | --- | --- | --- | --- |
| 16 | 16.2 | .173 | .635 | 111 |
| 32 | 12.6 | .211 | .627 | 95 |
| 33 | 17.3 | .173 | .618 | 107 |
| 34 | 19.8 | .194 | .610 | 109 |
| 35 | 17.4 | .172 | .539 | 114 |

$^a$HTSBR (6% styrene/80% trans/3% vinyl)

As shown in FIG. 4 of the drawings which is illustrative of a pneumatic tire, especially a radial passenger tire, the tire comprises a carbon black reinforced sulfur vulcanized tread portion 1 in which all of the rubber of the tread can comprise the diblock SBR copolymer or polymer blends or mixtures of the same of the present invention. The tire also contains sidewalls 2, white sidewalls 3, beads 4 and belts 5.

We claim:

1. A pneumatic tire having a carbon black reinforced rubbery tread vulcanized with sulfur or sulfur furnishing materials, the rubber of said tread comprising a compounded rubbery solution polymer selected from the group consisting of I. a high trans copolymer-high vinyl polymer diblock copolymer,
II. a blend of a high trans copolymer and a high vinyl polymer and
III. a blend or mixture of a high trans copolymer-high vinyl polymer diblock copolymer, a high trans copolymer and a high vinyl polymer
  a. where said high trans copolymer is a copolymer of butadiene-1,3 and at least one copolymerizable monomer selected from the group consisting of styrene and isoprene, has a Tg of less than about −70° C. has an overall content of about 75 to 85% trans units and not over about 8% vinyl units in the butadiene segments and comprises about 25 to 80% by weight of the rubbery polymer,
  b. where said high vinyl polymer is at least one polymer selected from the group consisting of homo polybutadiene and copolymers of butadiene-1,3 and at least one monomer selected from the group consisting of styrene and isoprene, has a Tg of greater than about −70° C. and not aoove about −35° C. and has about 40 to 80% vinyl units in the butadiene segments and
  c. where in said rubbery polymer the total overall amount of styrene and/or isoprene is from about 5 to 20% by weight and the total overall amount of vinyl groups is from about 30 to 60%.

2. A pneumatic tire according to claim 1 where said rubbery solution polymer comprises a high trans styrene-butadiene copolymer rubber-high vinyl styrene-butadiene copolymer rubber diblock copolymer.

3. A pneumatic tire according to claim 1 where said rubbery solution polymer comprises a blend of a high trans styrene-butadiene copolymer rubber and a high vinyl styrene-butadiene copolymer rubber.

4. A pneumatic tire according to claim 1 where said rubbery solution polymer comprises a blend or mixture of a high trans styrene-butadiene copolymer rubber-high vinyl styrene-butadiene copolymer rubber diblock copolymer, a high trans styrene-butadiene copolymer rubber and a high vinyl styrene-butadiene copolymer rubber.

* * * * *